United States Patent [19]
Okuyama et al.

[11] Patent Number: 5,867,177
[45] Date of Patent: Feb. 2, 1999

[54] IMAGE DISPLAY METHOD FOR DISPLAYING A SCENE IN AN ANIMATION SEQUENCE

[75] Inventors: Satoshi Okuyama; Toshimitsu Suzuki; Yu Minakuchi; Katsutoshi Yano, all of Kawasaki, Japan

[73] Assignee: Fujitsu Limited, Kawasaki, Japan

[21] Appl. No.: 839,868

[22] Filed: Apr. 22, 1997

Related U.S. Application Data

[63] Continuation of Ser. No. 591,144, Jan. 25, 1996, abandoned, which is a continuation of Ser. No. 135,479, Oct. 13, 1993, abandoned.

[30] Foreign Application Priority Data

Oct. 13, 1992 [JP] Japan ................................. 4-274352

[51] Int. Cl.⁶ ..................................................... G06T 13/00
[52] U.S. Cl. .......................... 345/473; 345/302; 345/328; 707/104
[58] Field of Search ..................................... 345/302, 473, 345/474, 121, 328, 340; 707/3, 4, 102, 104, 501

[56] References Cited

U.S. PATENT DOCUMENTS

| 5,021,976 | 6/1991 | Wexelblat | 395/159 |
|---|---|---|---|
| 5,169,342 | 12/1992 | Steele et al. | 434/112 |
| 5,274,758 | 12/1993 | Beitel et al. | 395/154 |
| 5,347,628 | 9/1994 | Brewer et al. | 395/159 |
| 5,388,197 | 2/1995 | Rayner | 395/154 |
| 5,442,744 | 8/1995 | Piech et al. | 395/154 |
| 5,630,121 | 5/1997 | Braden-Harder et al. | 707/102 |

FOREIGN PATENT DOCUMENTS

| 62-276984 | 12/1987 | Japan . |
|---|---|---|
| 3-214220 | 9/1991 | Japan . |

OTHER PUBLICATIONS

Rosenstein et al. "The Hits Icon Editor, The Specification of Graphic Behavior Without Coding", Human Interface Laboratory, IEEE, pp. 523–530, 1990.

Hsia et al., "Construction & Manipulation of Dynamic Icons," The University of Kansas, IEEE, pp. 78–83, 1988.

*Macromind Mediamaker User Guide,* Macromind, Inc., 1990, pp. 22–25, 35, 93,117, 118, 134, 135,;160, 161.

Cowart, *Mastering Windows 3.1,* SYBEX Inc., 1992, p. 9.

*Primary Examiner*—Phu K. Nguyen
*Assistant Examiner*—Stephen Hong
*Attorney, Agent, or Firm*—Staas & Halsey

[57] ABSTRACT

The present invention provides an image display method for quickly displaying animation sequences corresponding to a keyword. The image display method displays a keyword and a still picture of one screen of an animation sequence representing the keyword on a screen, and when one of the keywords is designated, the animation sequences corresponding to the designated keyword are quickly displayed.

15 Claims, 17 Drawing Sheets

Fig.3

| Fig.3A | Fig.3B |
|---|---|

Fig.3A

| KEYWORD ID | KEYWORD DETECTION AREA COORDINATES | | | | No. OF CONTROL ANIMATION | ANIMATION WINDOW ID |
|---|---|---|---|---|---|---|
| | UPPER LEFT COORDINATES | | ORDINATE | ABSCISSA | | |
| | X | Y | | | | |
| 10 | 100 | 100 | 200 | 50 | 2 | 1000 |
| 11 | 100 | 200 | 200 | 50 | 2 | 1000 |
| 12 | 100 | 300 | 200 | 50 | 3 | 1000 |
| 13 | 100 | 400 | 200 | 50 | 3 | 1000 |

Fig.3B

| ANIMATION START ADDRESS | ANIMATION END ADDRESS | ANIMATION WINDOW ID |
|---|---|---|
| 20000 | 20200 | 1001 |
| 20500 | 21300 | 1001 |
| 21100 | 22000 | 1001 |
| 23000 | 23500 | 1001 |

Fig.3B

| ANIMATION START ADDRESS | ANIMATION END ADDRESS | ANIMATION WINDOW ID | ANIMATION START ADDRESS | ANIMATION END ADDRESS | KEYWORD DISPLAY FILE NAME | END ANIMATION WINDOW ID | END PROCESSING FLAG |
|---|---|---|---|---|---|---|---|
| 83200 | 83400 | | | | key001 | 1000 | 0 (END) |
| 84000 | 84700 | | | | key002 | 1001 | 0 (END) |
| 85000 | 86000 | 1002 | 54300 | 55200 | key003 | 1002 | 1 (REPETITION) |
| 87300 | 87800 | 1002 | 55800 | 56500 | key004 | 1000 | 1 (REPETITION) |

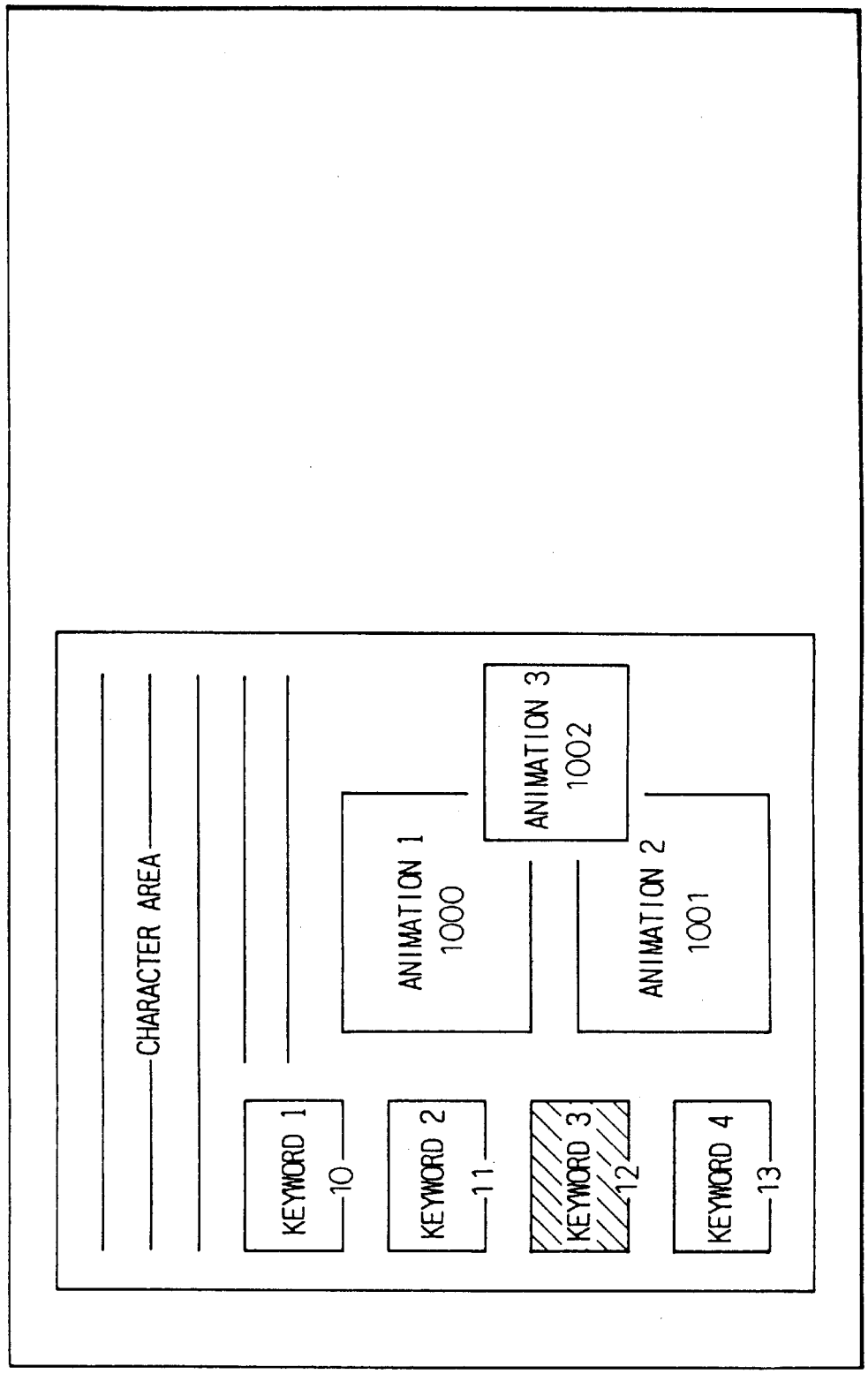

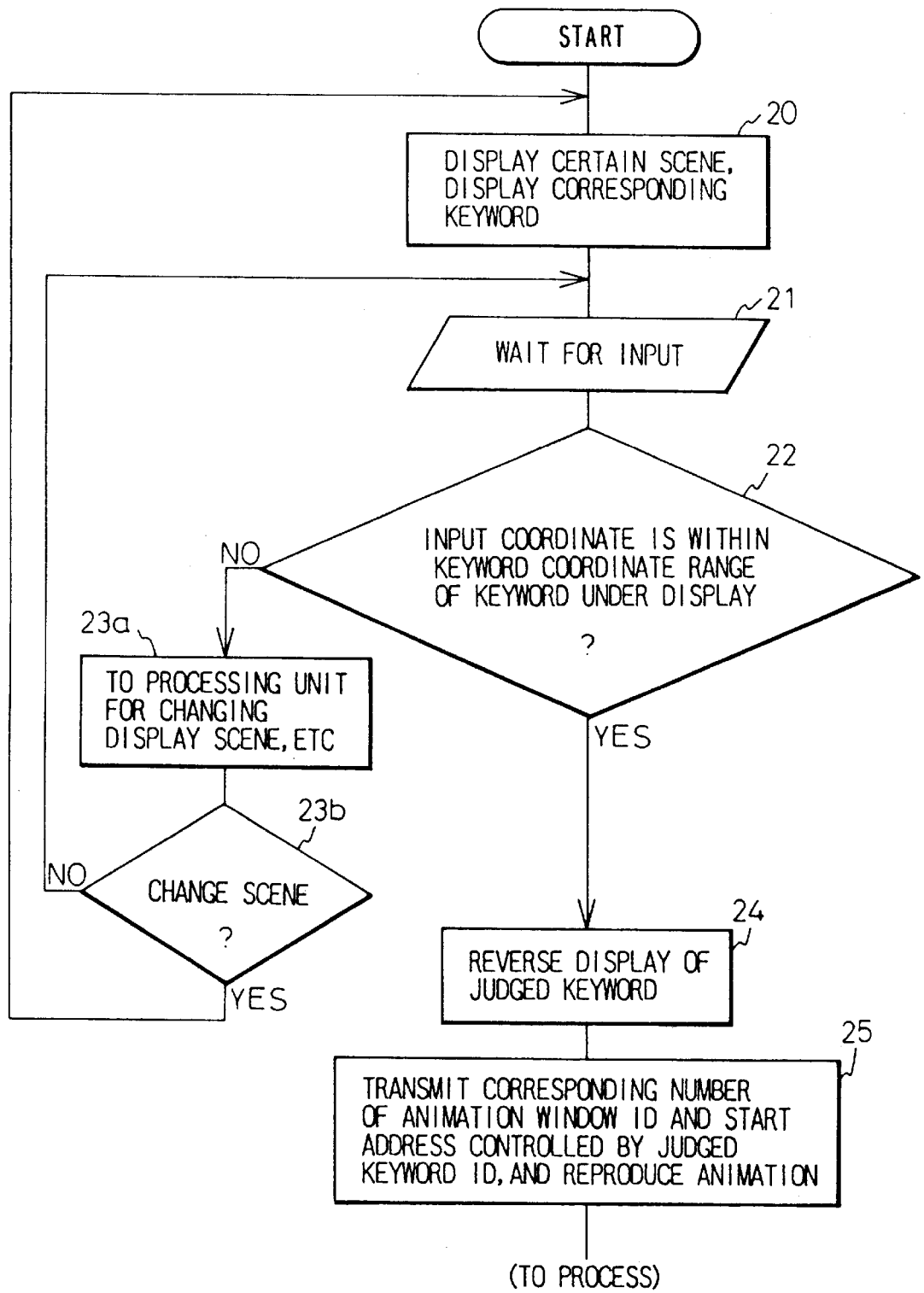

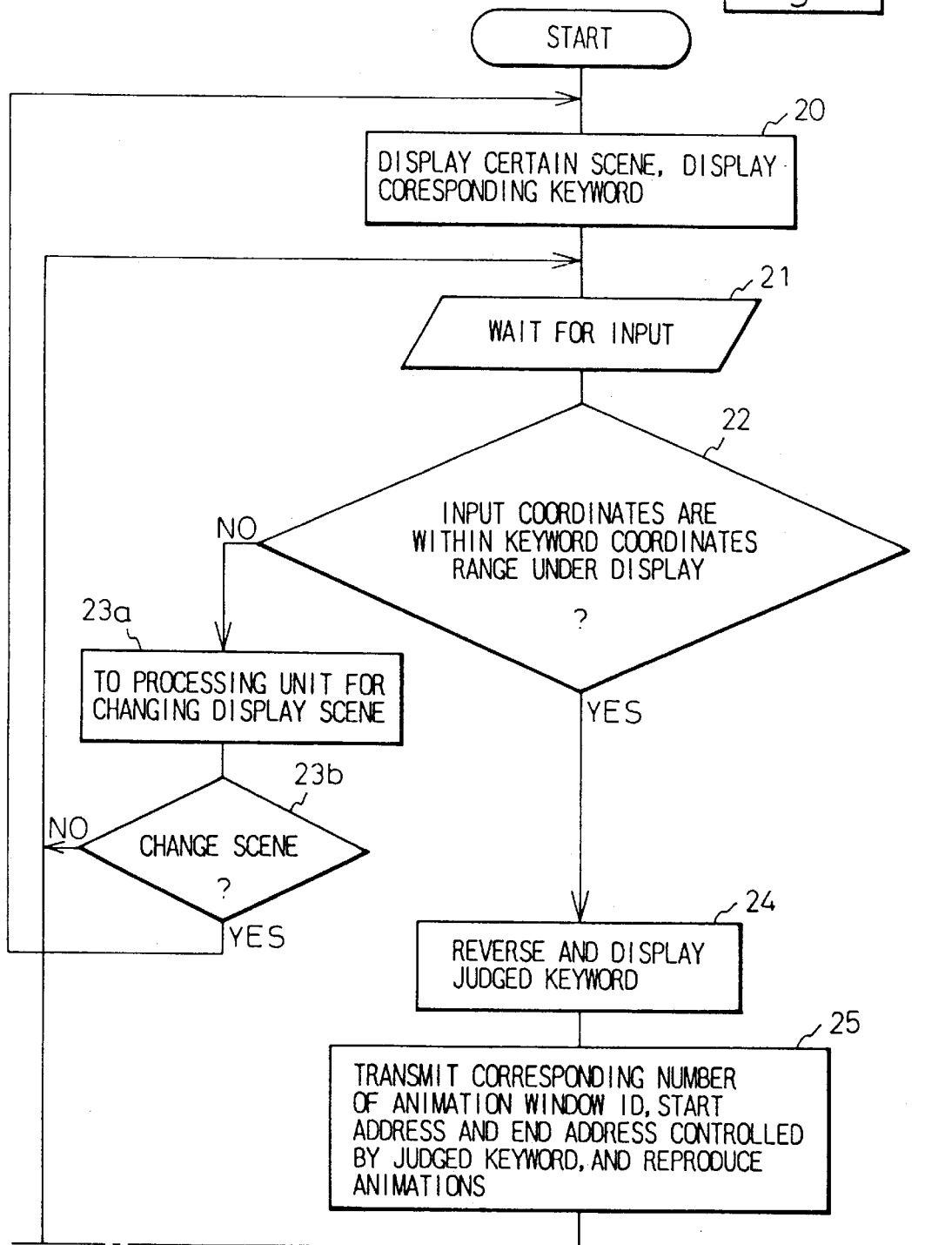

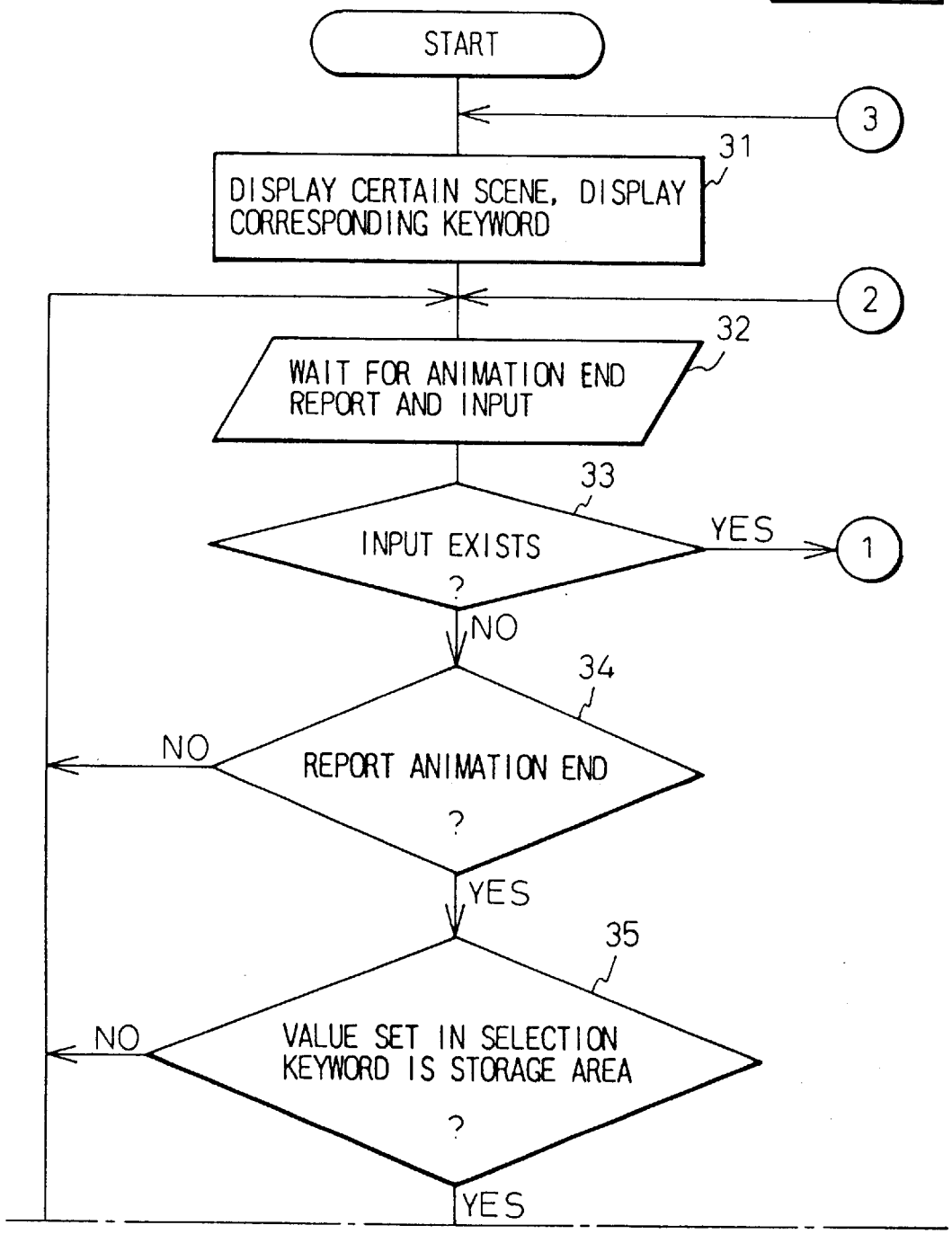

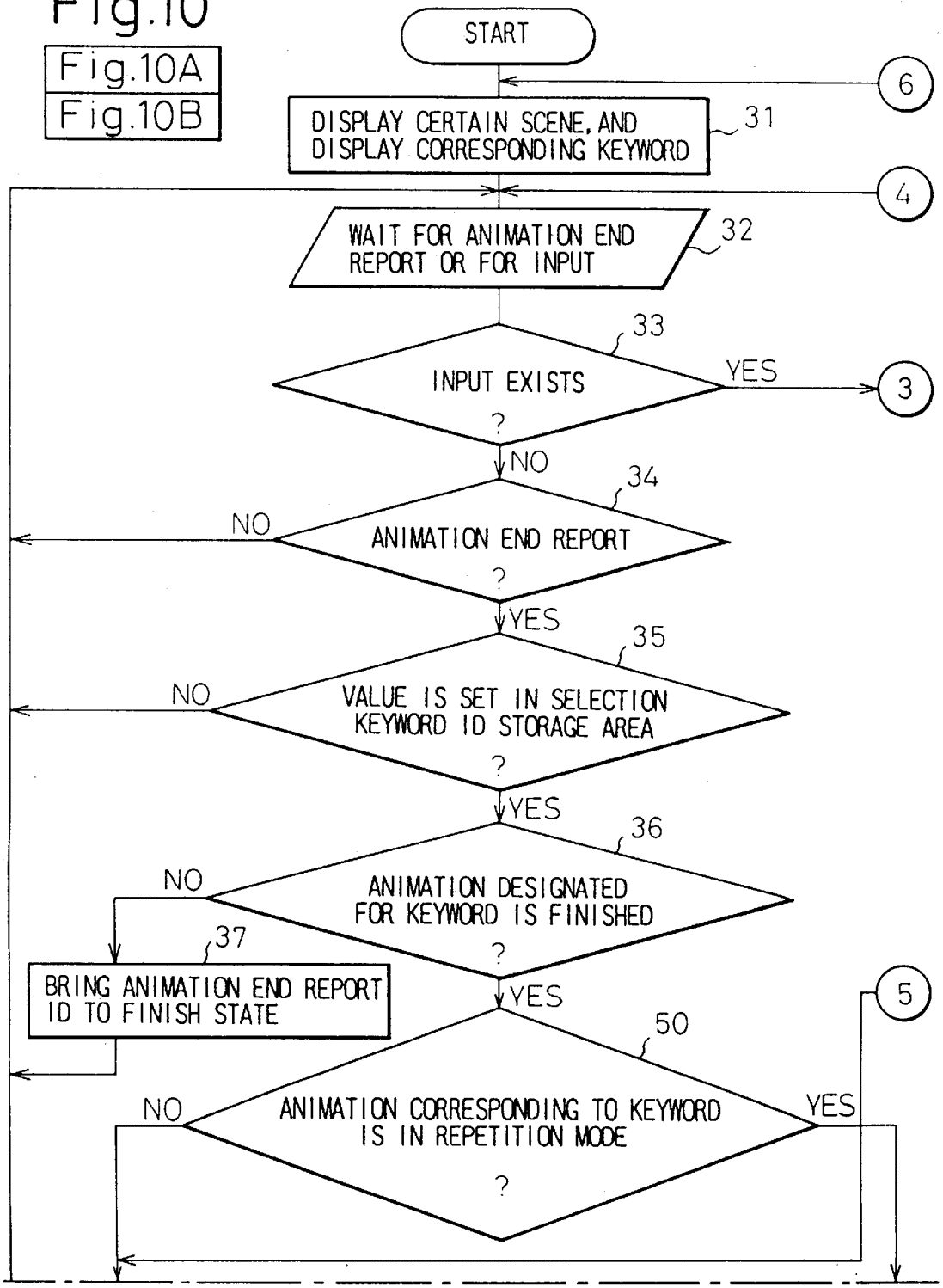

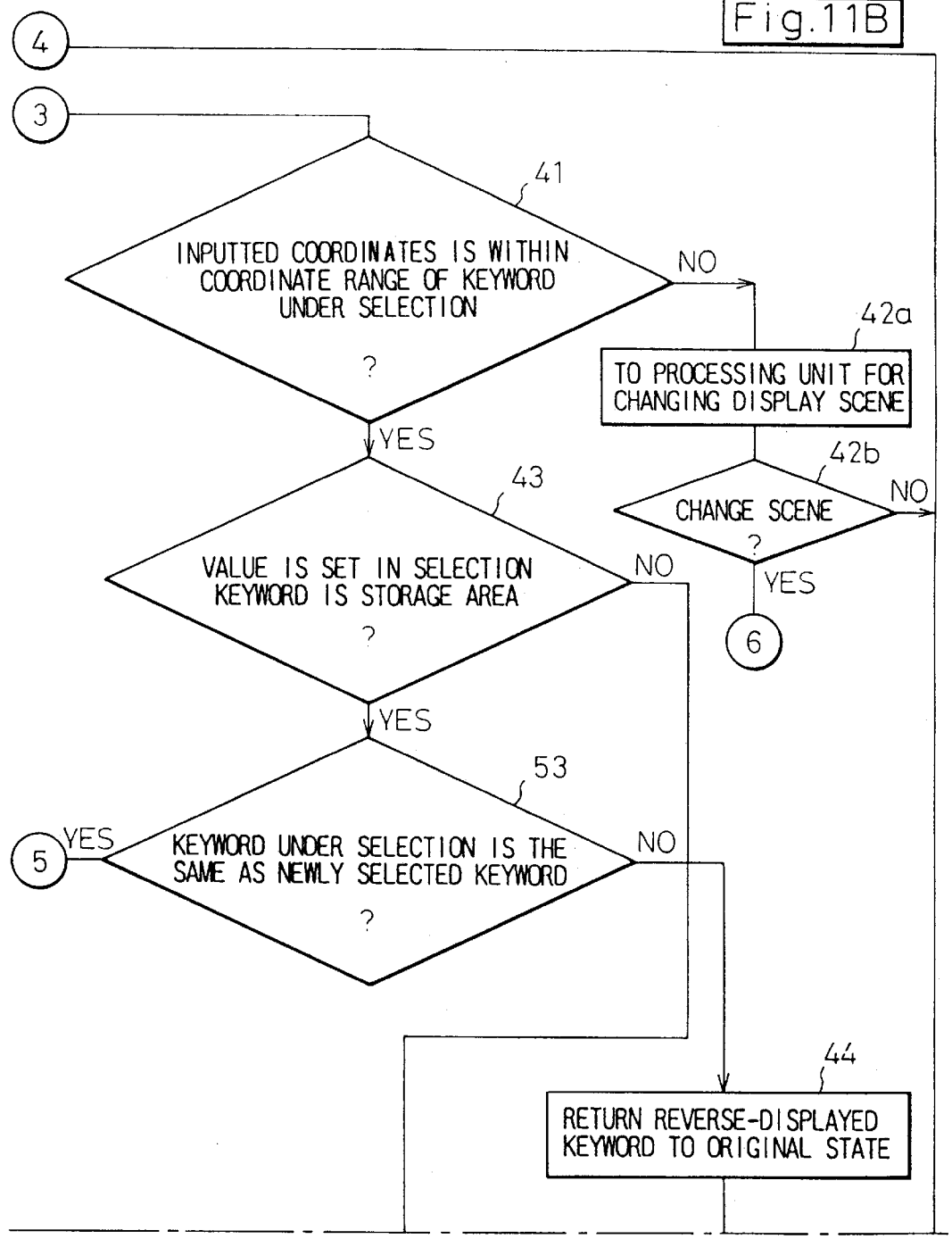

IMAGE DISPLAY METHOD FOR DISPLAYING A SCENE IN AN ANIMATION SEQUENCE

This application is a continuation of application Ser. No. 08/591,144, filed Jan. 25, 1996, now abandoned; which is a continuation of application Ser. No. 08/135,479, filed Oct. 13, 1993, now abandoned.

BACKGROUND OF THE INVENTION

1. Field of the Invention

This invention relates to a method of displaying animation.

2. Description of the Related Art

When different animation sequences are displayed in multiple windows on a display screen, an object can be viewed from various angles simultaneously, or a desired animation sequence can be retrieved quickly, and various other advantages can be obtained. Means for displaying a plurality of animation sequences on the same screen according to the prior art displays each animation sequence in a separate window as shown in FIG. 12 of the accompanying drawings, and a method of controlling such a display disposes control buttons on a 1:1 basis for each animation sequence.

However, these multiple animation sequences have no link between them as far as user operation is concerned, and the user must designate a desired animation sequence and view each one individually. In other words, it has not been possible for the user to simultaneously view a plurality of animation sequences with a certain synchronous relationship between them, or to view associated animation sequences by designating a keyword associated with a certain document or data. When a plurality of animation sequences represent a condition of driving a car, for example, these animation sequences need to show views from outside the car or from a driver's point of view so as to clearly show the operation of the car, its performance and appearance, and so forth.

According to the prior art, only one reproduction button is provided for controlling the animation, and the user must fast-forward the animation to reproduce the desired portion from a series of animation sequences. The method shown in FIG. 12 has a feature that the user can freely set the portions which he wants to view. Considering future applications where animated information will be supplied great amounts, however, it will be necessary for suppliers of animated information to also provide a method of quickly accessing a desired animation sequence in the sense of an information filter.

Though the prior art technology shown in FIG. 12 can certainly display a plurality of animation sequences, control keys are merely provided for each animation sequence, and these animation sequences are displayed quite independently of each other. Further, each set of control keys merely controls the reproduction, stop, fast-forward and rewind of the respective animation sequence regardless of its content. In other words, it has not been possible for the user to retrieve the contents of these animation sequences in advance.

In the future, with the advent of B-ISDN (Broadband Integrated Services Digital Network), development of workstations having a high processing capacity, etc., which will ensure easy handling of multi-media systems, is expected. Therefore so the display of a plurality of animation sequences with mutual linkage will become possible. Accordingly, a method of accomplishing such a display will become necessary, and a method which enables the user to quickly watch a desired portion or portions from among large quantities of animated information will be desired.

SUMMARY OF THE INVENTION

In view of the problems described above, the present invention provides an image display method which can quickly display animation in response to keywords.

To accomplish the object described above, an image display method according to the present invention displays keywords each with one picture of an animation sequence representing the keyword as a still picture on a screen, and then displays a selected animation sequence corresponding to a keyword when one of the keywords is designated.

More specifically, the image display method according to the present invention employs a construction wherein a plurality of keyword display areas for individually displaying a plurality of kinds of keywords, and an image display area capable of simultaneously or individually displaying a plurality of kinds of animation sequences or still pictures are disposed on a screen, and a plurality of kinds of still images or animation sequences corresponding to at least one of the keywords displayed in the keyword display areas, or a plurality of kinds of still images or animation sequences corresponding respectively to a plurality of kinds of keywords displayed in the keyword display areas, are displayed in the image display area.

In the method of the present invention, a plurality of still images corresponding to at least one of the keywords displayed in the keyword display areas or a plurality of kinds of still images corresponding respectively to a plurality of kinds of keywords displayed in the keyword display areas, are displayed in the image display area at an initial stage.

In the method of the present invention, when at least one of the keywords displayed in the keyword display areas is selected, at least one of the still images corresponding to this keyword and displayed in the image display area is simultaneously switched to the corresponding animation display.

In an example of application of the image display method according to the present invention, animation sequences having animation window IDs corresponding to all of the keyword IDs can be displayed.

Further, in the method of the present invention, a keyword ID, a display area for displaying a keyword, an animation window ID for representing the corresponding animation, and animation information describing a start address and an end address of the animation of this animation window are provided for each keyword, and when the display area is designated in order to designate the keyword, the animation having the animation window ID is displayed from the start address and its display is completed by the end address.

When the keyword described above is designated, its keyword display area assumes a different display form from those of other non-selected keywords, and is displayed, for example, in inverted form.

When the display of all the animation sequences having the animation window IDs corresponding to the keyword ID described above is completed, the inverted display of the keyword display area described above is returned to the original display.

When a plurality of animation window IDs corresponding to the keyword window ID exist, one of them described as the end animation window ID is the animation information described above. When the display of this end animation window ID is completed, the display of the animation of the corresponding keyword ID is completed.

When the display of the end animation window ID described above is completed, the inverted display of the keyword display area described above is returned to the original display.

When another keyword is designated during the display of the animation corresponding to one keyword described above, the animation display for this one keyword is suspended, and the animation corresponding to the other keyword is started.

Further, an end processing flag for representing the existence or absence of repetition of display for each keyword ID is disposed in the animation information described above, and when this end processing flag requires repetition of display, the display of the animation window ID corresponding to the keyword is displayed repeatedly a predetermined number of times.

Further, when the keyword for which animation is being displayed is designated again, the inverted state of this keyword is returned to the original state, and the displays of all the animation window IDs corresponding to this keyword are terminated.

BRIEF DESCRIPTION OF THE DRAWINGS

FIGS. 3, 3A and 3B combine as a table showing n example of a keyword control table;

FIG. 4 is a schematic view showing an example of a display screen for keyword selection;

FIG. 5 is a flowchart showing an animation display control by keyword selection;

FIGS. 7, 7(A) and 7(B) are flowcharts for starting reproduction of an animation by keyword selection and finishing keyword selection by the end of a designated animation;

FIGS. 8, 8(A), 8(B) and 9 are flowcharts for selecting different keywords during reproduction of an animation and reproducing the animation having different keywords;

FIGS. 10, 10(A), 10(B) and 11, 11(A), 11(B) are flowcharts showing an operation for repeatedly displaying an animation sequence for one keyword;

DESCRIPTION OF THE PREFERRED EMBODIMENT

Figure 1:
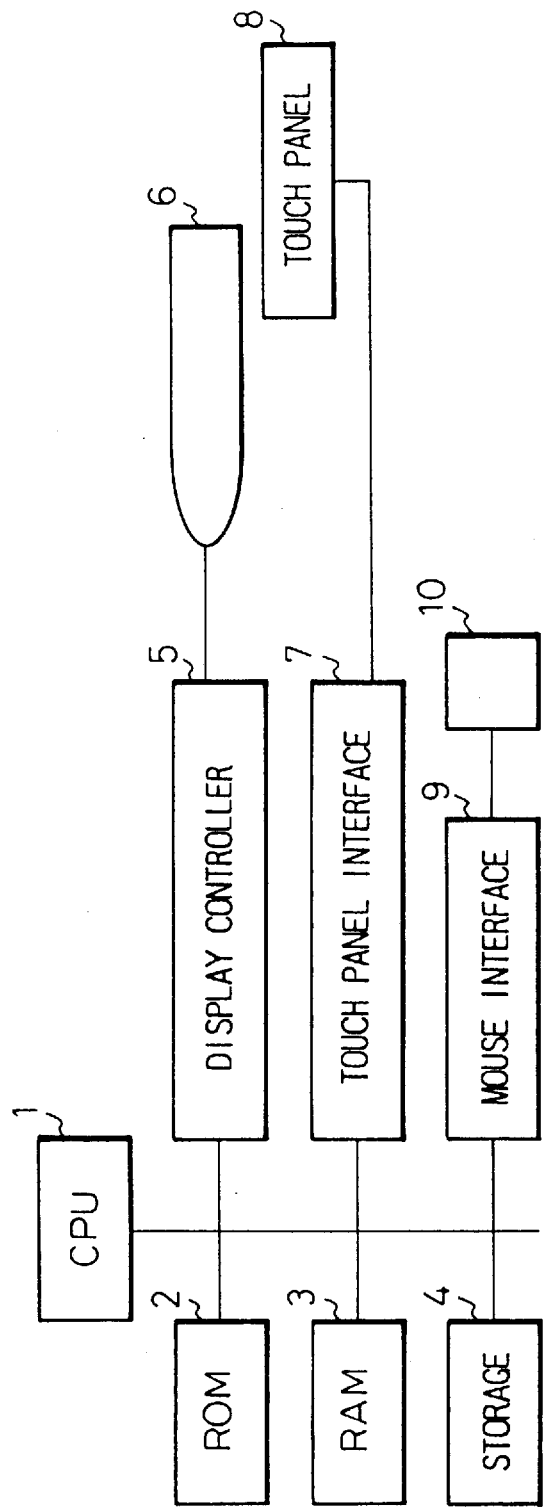
FIG. 1 is a block diagram showing an image display system according to an embodiment of the present invention.

The image display method according to the present invention employs the definite basic construction as described above, and is characterized in that a plurality of keyword display areas for individually displaying a plurality of kinds of keywords and an image display area capable of displaying simultaneously or individually a plurality of kinds of animation sequences or still pictures are disposed on a screen. Further, a plurality of kinds of still pictures or animation sequences corresponding to at least one of the keywords displayed in the keyword display areas or a plurality of kinds of still pictures or animation sequences corresponding to a plurality of kinds of keywords displayed in the keyword display areas, respectively, are displayed in the image display area.

The image display method further employs the construction wherein a plurality of kinds of still pictures corresponding to at least one of the keywords displayed in the keyword display area or a plurality of kinds of still pictures corresponding respectively to a plurality of kinds of keywords displayed in the keyword display areas are displayed in the image display area at the initial state of the screen.

The image display method of the present invention further employs the construction wherein at least one of the still images corresponding to at least one of the keywords displayed in the image display areas is switched to the animation display when at least one of the keywords displayed in the keyword display area is selected.

Accordingly, in the image display method according to the present invention, a keyword and a still picture of one screen of an animation sequence representing the content of the keyword are displayed on the screen. When a user designates a desired keyword among the keywords displayed, the animation sequence corresponding to the content of the keyword is displayed. Therefore, a desired animation sequence can be easily retrieved by a keyword. When a keyword is designated, the animation sequence corresponding to that keyword can be quickly obtained. For this reason, a fast-forward operation for obtaining the desired picture, that has been necessary according to the prior art, is no longer necessary.

In order to quickly display the keywords and the animation sequences associated with the keywords, the keyword IDs, a display area for displaying the keywords, an animation window ID representing one or a plurality of animation sequences corresponding to a keyword, and a start address and an end address for the animation of each animation window, are described in animation information. When the display area of a keyword is designated by a pointing device, or the like, the animation sequence having the corresponding animation window ID is displayed from the start address to the end address, and all the animation sequences corresponding to the keyword, which is described in the animation information, are displayed.

When a keyword is designated, this keyword is displayed in the various ways such as inverted display, flashing of dots, display in different colors, in a different form of display from non-selected keyword areas, etc., so that the selection of that keyword can be confirmed easily and reliably, and the keyword of the animation sequence which is presently being displayed can be easily confirmed.

When the display of all animation sequences having the animation window ID corresponding to the designated keyword is completed, the inverted keyword is returned to the original form, and the user can easily see that the animation display relating to this keyword is completed.

When a plurality of animation windows corresponding to a keyword ID exist, one of them is used as the end animation window ID, so that when the display of this animation is completed, the display of the keyword is terminated even if all of the animation sequences are not completed. According to this arrangement, if the animation sequence represented by this end animation window ID is set as the animation sequence which most faithfully represents the content of the keyword, the content of the keyword may be grasped without watching the remaining animation sequences, and the animation sequences of another keyword can be viewed. In this way, the retrieval time can be reduced when a large number of keywords are retrieved to search for a desired animation sequence.

When the display of this end animation window is also terminated, the inverted display of the corresponding keyword is returned to the original form, for example, and this makes it possible to easily see that the display of the animation sequence corresponding to the keyword is completed.

When another keyword is designated during the display of the animation sequence corresponding to one keyword, the animation sequence of the keyword being displayed is terminated and the animation sequence of the keyword which is newly designated is displayed. In this way, the display of the animation sequence of a keyword which is presently being displayed is suspended and the animation sequence of the next keyword can be displayed quickly.

Information of a certain keyword is described in advance in the animation information so that the display of the animation sequence corresponding to this certain keyword can be repeatedly displayed a predetermined number of times. In this way, it becomes easy to repeatedly view animation sequences corresponding to the same keyword.

When a keyword displayed in inverted form is designated, the display of all the animation sequences corresponding to this keyword is suspended, and the inverted display is returned to the original display. In this way, the display of the animation sequences of the keyword being display can be easily stopped.

Hereinafter, a preferred embodiment of the present invention will be described with reference to the accompanying drawings.

FIG. 1 is a block diagram showing the construction of an image display system according to an embodiment of the present invention. A CPU 1 controls the system as a whole, and programs executed by the CPU 1 and the data frequently used are stored in a ROM 2. A RAM 3 is used for storing the programs read out by the CPU 1' from the ROM 2 and is also used as a work area for the CPU 1. Data of animation sequences, etc., are stored in a storage device 4. A display controller 5 reads out the animation sequences, etc., stored in the storage device 4 and displays them on a display 6. A touch panel 8 and a touch panel interface 7 input commands relating to those characters and graphics, which are displayed on the display 6, and by being touched by an operator. A mouse 10 and a mouse interface 9 are used to enter commands to the display screen. Incidentally, either one of the touch panel 8 or the mouse 10 may be sufficient.

Figure 2:
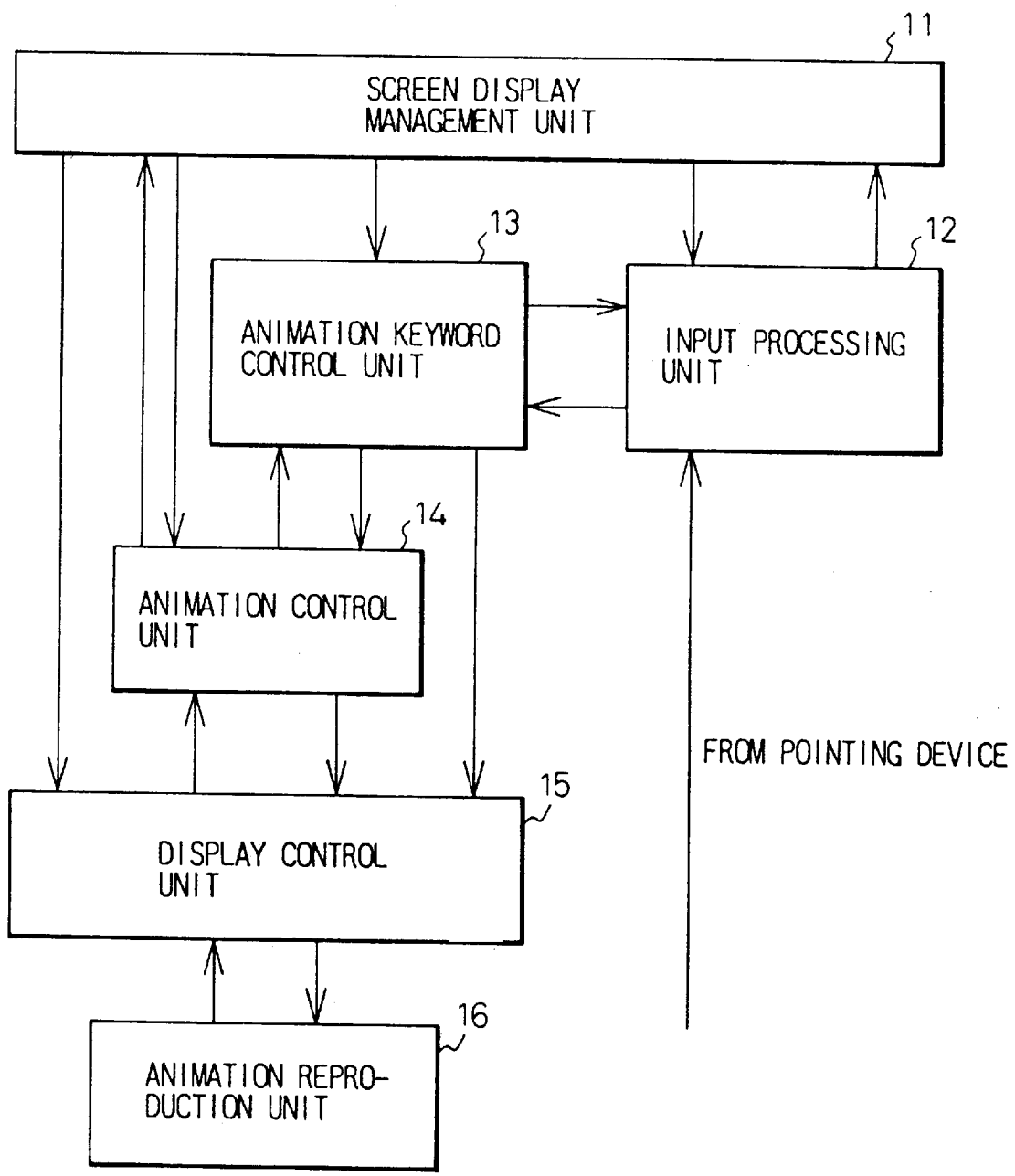
FIG. 2 is a block diagram showing a display system of information to be displayed on a screen.

FIG. 2 shows the display system of information for screen display. A screen display management unit 11 manages the display as a whole and instructs the display of a corresponding medium for each display zone to a display controller 15. An input processing unit 12 judges which areas are input by a user, an animation keyword control unit 13 controls the display and selection of the keywords, an animation control unit 14 controls the animation sequences to be displayed, and the display control unit 15 accesses files, etc., from the storage 4 and displays for each medium. An animation reproduction unit 16 reproduces the animation sequences under the control of the display control unit 15.

FIG. 3 shows a keyword controlling table necessary for executing the present invention. This table is controlled for each scene displayed on the screen. When a certain scene is displayed, a table corresponding to that scene is managed by the animation keyword control unit 13. Each parameter of the table for controlling the animation from the keyword comprises a keyword ID number, an area coordinate range for detecting the user's selection when a keyword is selected, the number of animation sequences to be controlled at the time of the selection of the keyword, animation start/end addresses for starting and ending window ID/animation sequences for that number of animation sequences, a file name storing image data for displaying the keyword, a typical animation window ID for finishing all the animation sequences at the end of an animation sequence displayed as a typical example and synchronizing sequence displays when a plurality of animation sequences have mutually different lengths, and an end processing flag for use for repeated display at the end of an animation sequence. The animation start/end addresses may be a counter of a VTR (Video Tape Recorder) or of a LD (Laser Disc), or the addresses of a device stored as a frame number or digital data. The data shown in FIG. 3 are set in advance the supplier or the animation sequences.

FIG. 4 shows an example of the screen according to this embodiment. The screen displays the keywords and a window which displays a still display of one screen of an animation sequence corresponding to each keyword. Though FIG. 4 shows only the window of the animation sequence corresponding to the keyword 3, the animation sequence corresponding to each keyword is displayed in practice.

Next, the operations of this embodiment will be explained with reference to flowcharts.

FIG. 5 shows the flow of the reproduction of a corresponding animation sequence by keyword selection. First of all, the screen display management unit 11 sends an instruction to display a certain display scene to the display control unit 15, and a screen such as shown in FIG. 4 is displayed (Step 20). Incidentally, a file exists for each page displaying a display scene, which describes character data, a still image, the position of the animation, size, priority of overlap and the data storage position. Further, there exists a file representing the construction of a document constituting a page. To display a desired display scene on the screen, an icon (graphic character) representing each display scene is displayed on the screen and is designated by the touch panel 8 or the mouse 10 so as to open or turn over the page.

An instruction instructing which keyword is to be designated from among the keywords shown in FIG. 4 is awaited (Step 21). When the user designates a keyword, the screen display management unit 11 examines whether or not the input coordinates (the designated range) exist inside the keyword detection coordinates shown in FIG. 3 (Step 22). When the coordinates do not exist, the flow proceeds to the processing unit for changing the display scene, that is, the processing unit for managing the next page/preceding page (Step 23a). When the input is the corresponding input, the display scene is changed (Step 23b) and the flow returns to Step 20. However, the flow returns to Step 21 if the display scene does not change. When the input coordinates exist inside the coordinates, this keyword is displayed in inverted form and notified to the user by assuming that the keyword existing inside these coordinates is designated (Step 24).

At this time, the screen display control unit 11 reads out the keyword management table shown in FIG. 3, instructs the display control unit 15 to display it with the keyword display file name containing the image data of the keyword to be displayed, and registers the area to be detected with the input processing unit 12 as the keyword selection. The input processing unit 12 registers this area, and when the corresponding area is selected, it reports the selection to the necessary processing units.

When the keyword is designated in this way, the input processing unit 12 reports the designated keyword ID to the animation keyword control unit 13, and the animation keyword control unit 13 transmits all the animation window IDs and the start addresses that are controlled by the designated keyword ID, to the animation reproduction unit 16. The animation reproduction unit 16 then reproduces the animation sequences (Step 25).

The operations described above will be explained in further detail with reference to FIG. 3. The input processing unit 12 waits for the user's input designating a keyword. When (100, 100), for example, is indicated, the input processing unit 12 reports this selection with the keyword ID 10 to the animation keyword control unit 13 by judging that ID 10 of the registered keywords is selected. The animation keyword control unit 13 instructs the display control unit 15 to display the displayed keyword ID 10 in inverted form, and instructs the animation reproduction unit 16 to reproduce the animation sequences in animation window IDs 1000 and 1001 corresponding to the keyword table shown in FIG. 3, with the start addresses 2000, 83200. In this way, reproduction of the animation sequence is carried out. Inversion of the keyword display which is executed in the display control unit 15 can be accomplished by processing the data of the frame memory of the corresponding area, or by another method which provides the reversed data file as the file name in the table shown in FIG. 3 so that the animation keyword control unit 13 can read the bit data from this file name and report it to the display control unit 15.

As a data processing method of the frame memory of the corresponding area in the inverted display of the keyword described above, the color of the base can be changed by a logic computation, such as XOR (Exclusive-OR), between the data of the keyword area designated in the frame memory and a certain predetermined color data, and writing the result.

Figure 6:
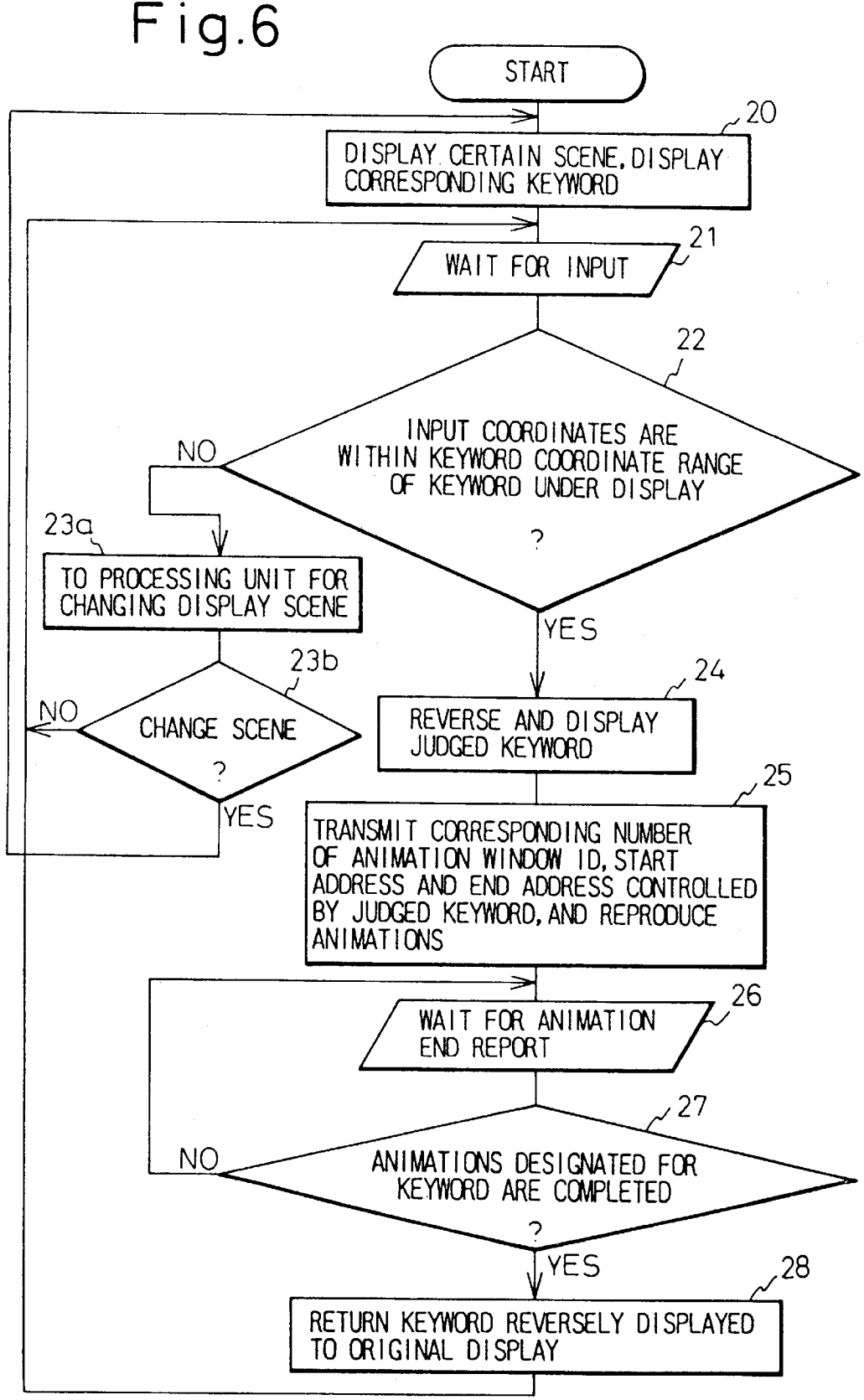
FIG. 6 is a flowchart in which an end operation of an animation is added to the flowchart shown in FIG. 5.

FIG. 6 is a flowchart in which the end operation of the animation is added to the operation flowchart shown in FIG. 5. The same step numbers of as in FIG. 5 represent the same steps in FIG. 6. This flowchart represents the flow of the process for returning the reverse display of the keyword when the animation is displayed to the animation end address of the table shown in FIG. 3. At the time of the keyword selection, the animation end address is sent to the animation reproduction unit 16 in addition to the animation window ID and the animation start address. In this way, the animation reproduction end is reported from the animation reproduction unit 16. After sending the instruction for the reproduction of the animation to the animation reproduction unit 16, the animation keyword control unit 13 waits for the animation end report (Step 26). When it receives the end report of all the animation sequences reproduced by the selected keyword (after receiving the end reports of both of the animation window IDs 1000 and 1001 at the time of the selection of the keyword ID 10; Step 27), the animation keyword control unit 13 sends an instruction to the display control unit 15 to return the inverted keyword display to the original display and the inverted display is returned to normal (Step 28). Thereafter, the mode again enters the keyword selection waiting state.

Figure 7B:
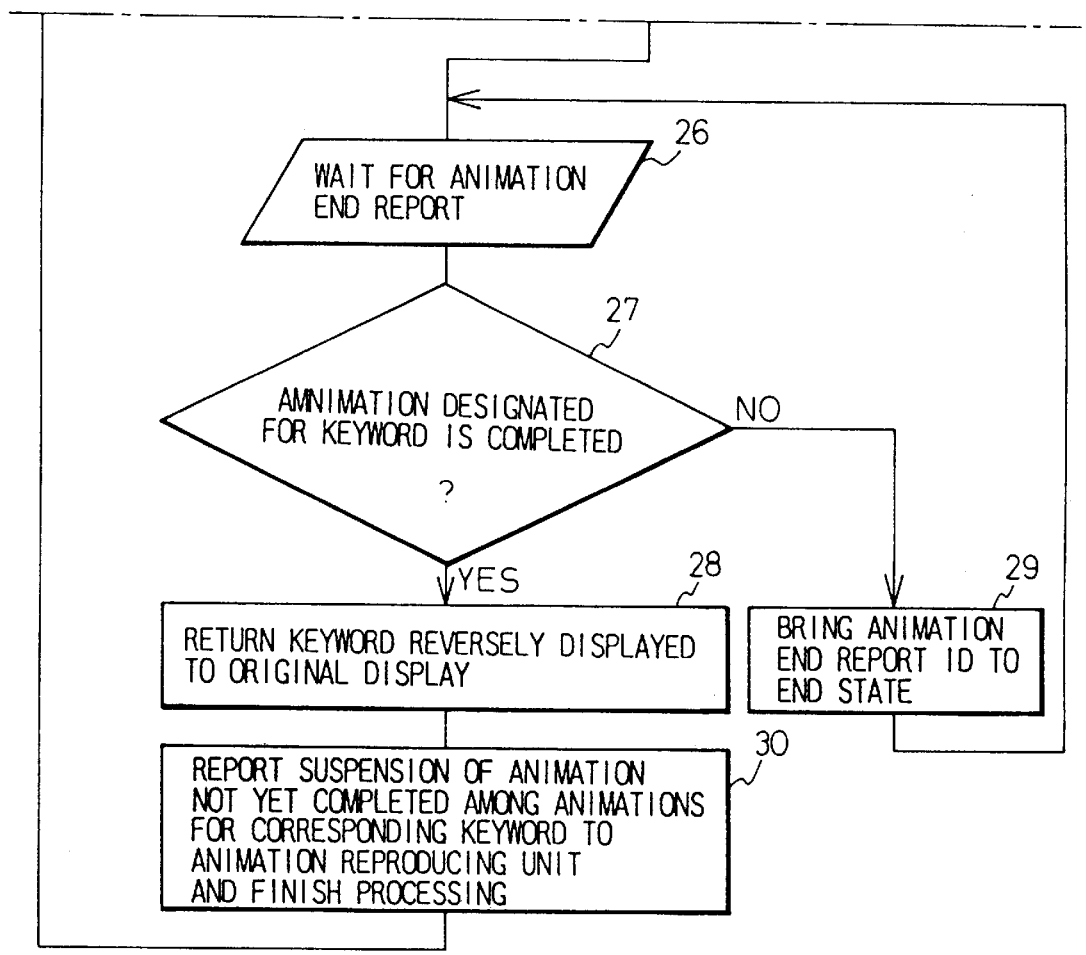

FIGS. 7(A) and 7(B) show a method of ending all the animation sequences which are reproduced by one keyword, without waiting for the end of reproduction of a plurality of animation sequences when these animation sequences are reproduced by the keyword, by the end of a predetermined typical animation sequence. An animation sequence which represents most significantly the content of the corresponding keyword or the shortest animation sequence is selected as this typical animation sequence. The steps in FIGS. 5 and 6 which have the same reference numerals have the same content.

When the corresponding animation sequences (animation window IDs 1000, 1001, 1002) in FIG. 3 are reproduced at the time of selection of the keyword (e.g., the keyword ID 12), the animation keyword control unit 13 waits for the animation end report (Step 26). In this case, it waits for the end report of the animation window 1002 as shown in the table of FIG. 3. When it receives first the animation end report from the animation window 1000, the animation keyword control unit 13 regards the report as reporting that the display of the animation window 1000 is completed (Step 29), and further waits for the animation end report. Next, when it receives the animation end report from the animation window 1002, the animation keyword control unit 13 regards this report as the end of all the animations for this keyword (Step 27) and instructs the display control unit 15 to return the inverted keyword to the original display (Step 28). Next, it reports the interruption completion of the animation window ID1001, for which the end report has not yet been received, to the animation reproduction unit 16, and the animation reproduction of the corresponding keyword is completed (Step 30).

Figure 8B:
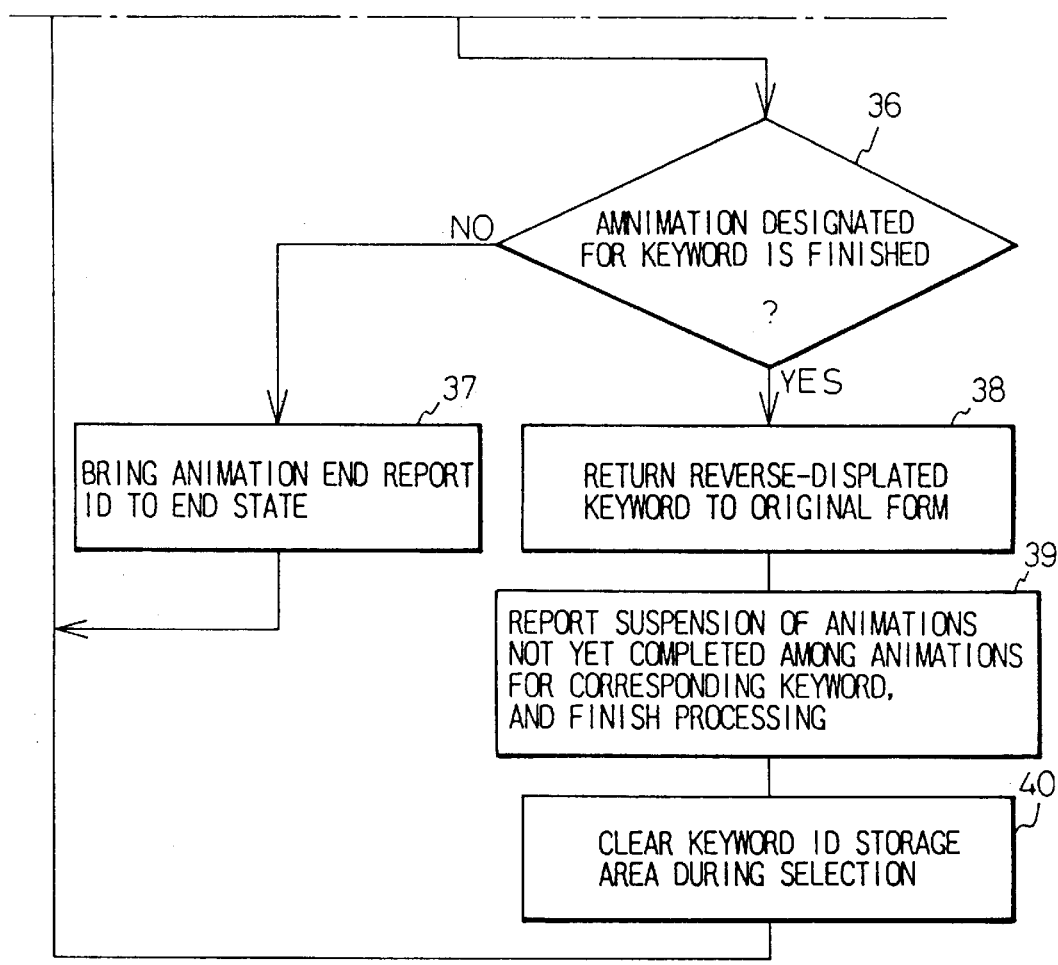
Figure 9:
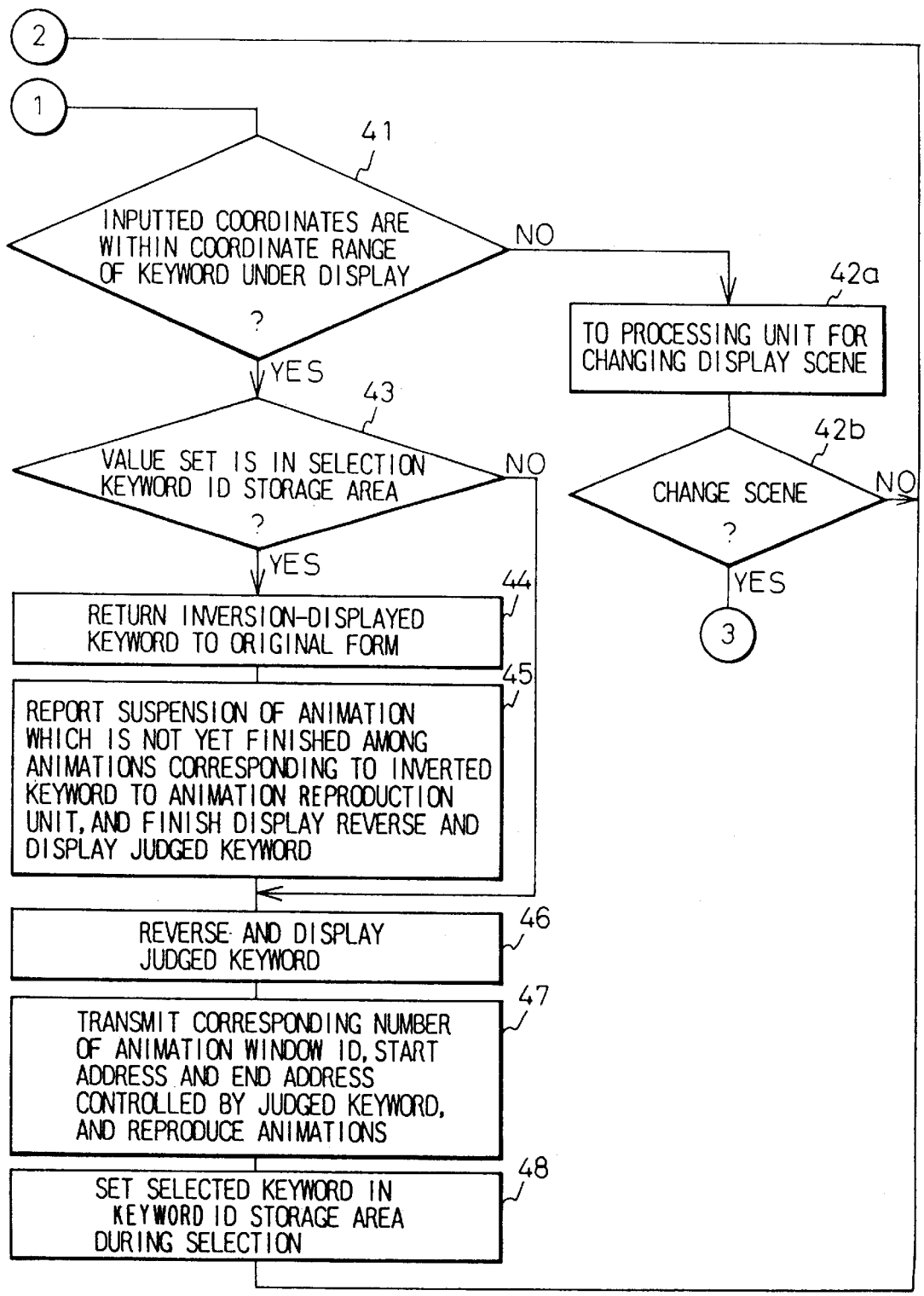
Figure 10B:
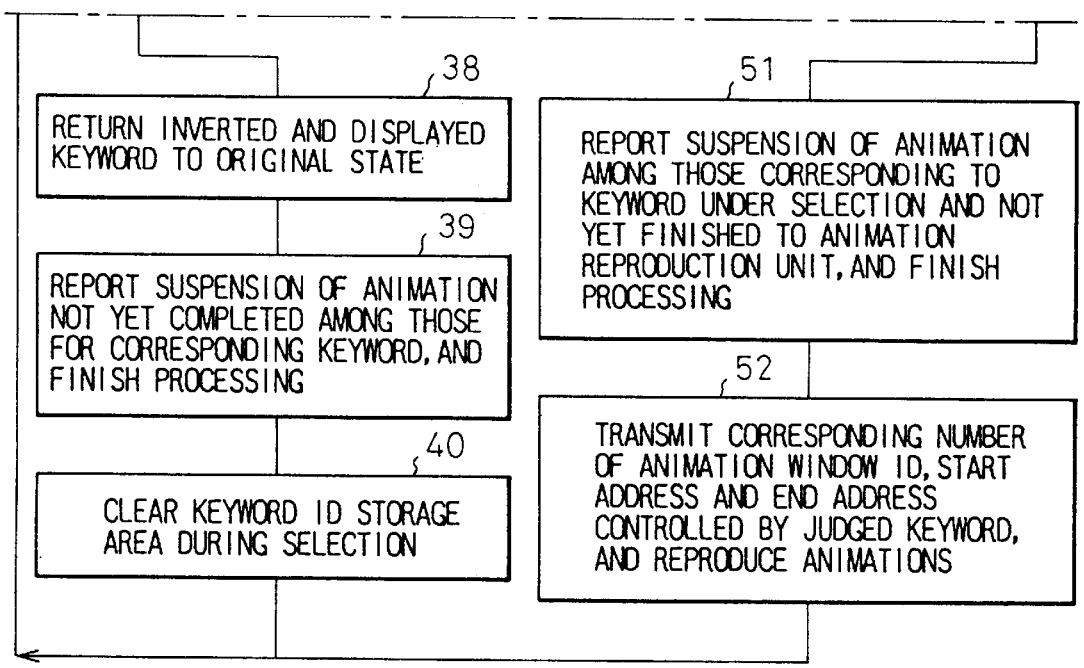
Figure 11B:
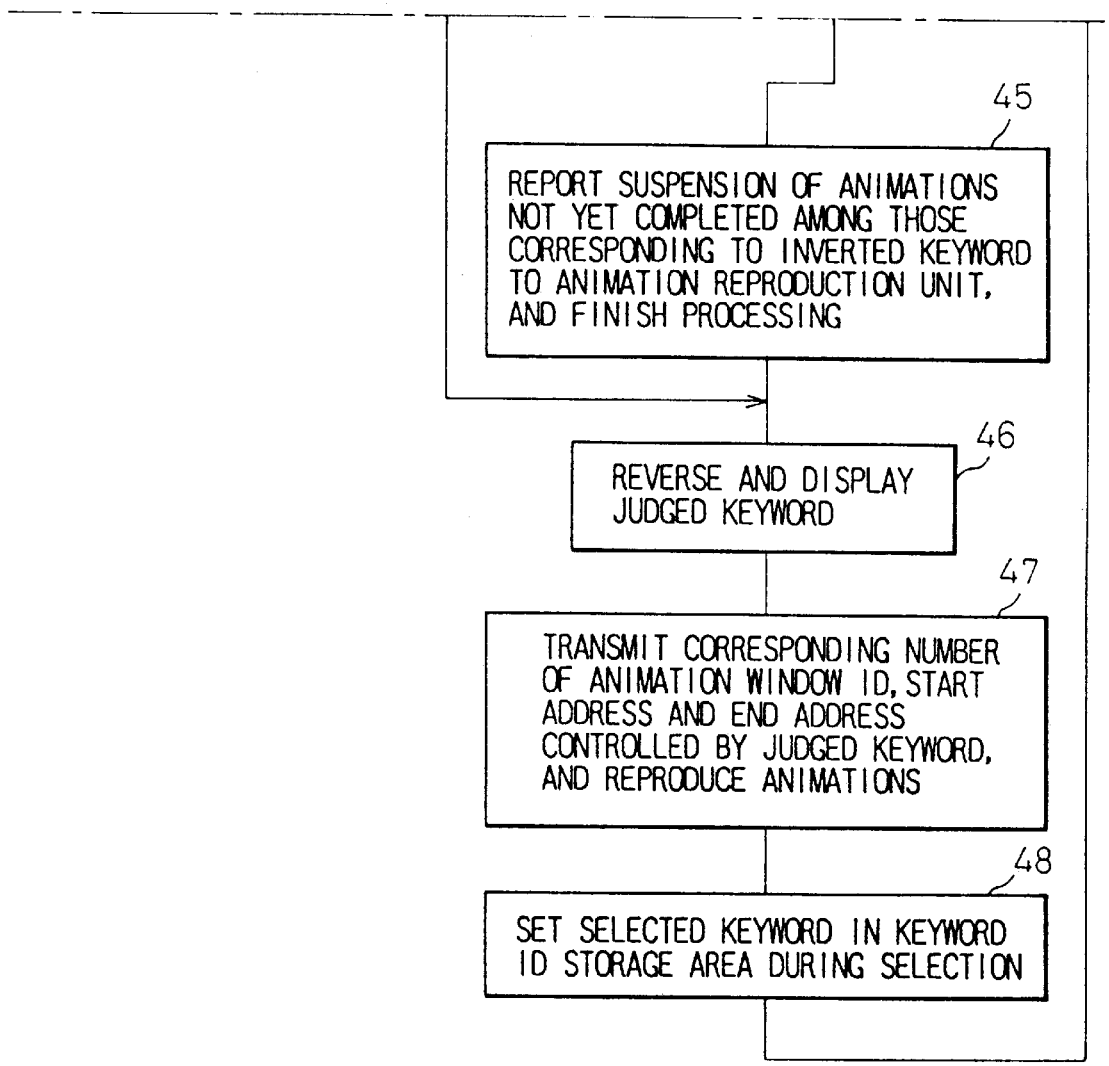
Figure 12:
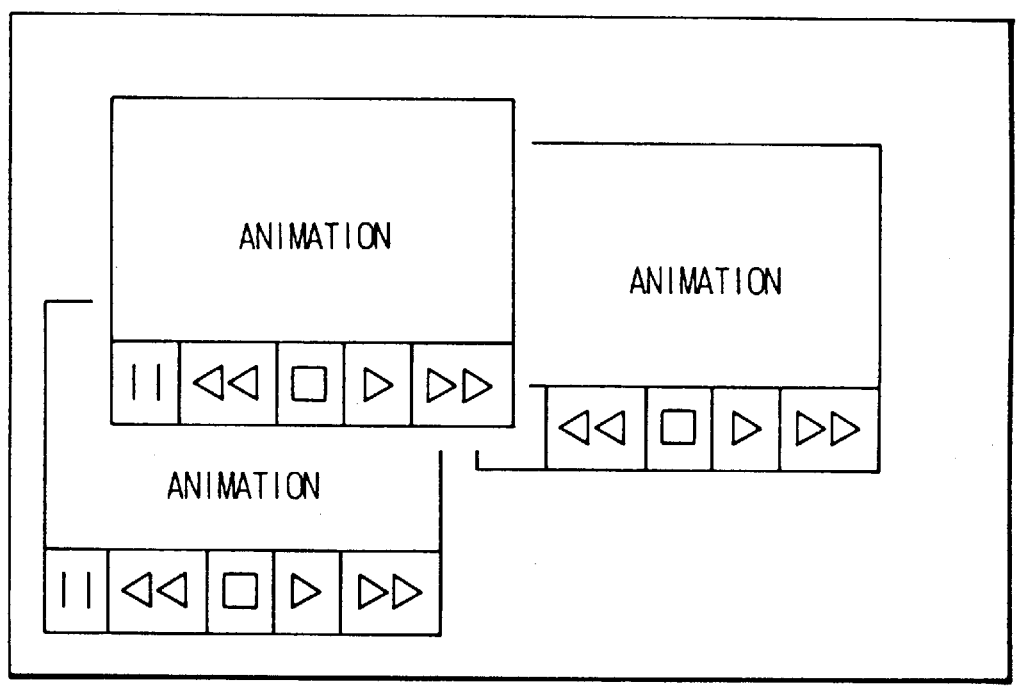
FIG. 12 is a schematic view showing an animation display method according to the prior art.

FIGS. 8(A), 8(B) and 9 are operation flowcharts showing when a new keyword is selected, the present animation reproduction is completed during the reproduction of the present animation, and the animation reproduction by this new keyword is executed. For example, this corresponds to the case where the content of the animation of the keyword, which is selected at present, need not be viewed any longer and the animation of a new keyword is desired to be viewed. To this end, an area for storing the keyword ID, which is currently selected, is disposed as internal information in the animation keyword control unit 13.

FIGS. 8(A) and 8(B) show the flow when the animation sequences for the keyword selected at present are sequentially displayed and ended. FIG. 9 shows the flow when the display of the animation sequence of the keyword which has already been selected, is forcedly completed and the animation sequence of a newly selected keyword is displayed.

In FIGS. 8(A) and 8(B), the screen shown in FIG. 4 is first displayed (Step 31), and the animation end report or a new input is awaited (Step 32). If no input exists (Step 31) but the animation end report is provided (Step 34), whether or not the value of the keyword ID selected at present is set to the selected keyword ID storage area disposed in the animation keyword control unit 13 is examined (Step 35). If it is set, whether or not the keyword ID is the end animation window ID for forcedly ending the animation of the keyword ID is examined (Step 36) when the animation explained with reference to FIGS. 7(A) and 7(B) are completed among the animation sequences designated for the set keyword ID, even though animation sequences, which are not yet displayed remain. If the keyword ID is the animation end report of the ordinary animation window ID, this animation window ID is brought to the end state (Step 37). If it is the end animation window ID, the inverted keyword is returned to the original display (Step 38) in order to forcedly complete the animation display of that keyword, and interruption of the animation, which corresponds to this keyword and is not yet completed, is reported to the animation reproduction unit 16 and the animation display is completed (Step 39). The keyword ID storage area is cleared during the selection (Step 40).

Next, in FIG. 9, when the input exists at Step 33 in FIG. 8, whether or not the input coordinates exist within the range of the coordinates of the keyword shown in FIG. 4 (Step 41) is determined. If they are out of the range, the flow proceeds to the processing unit for managing the next page/previous stage (Step 42*a*), and if the input is the corresponding input, the display scene is changed (Step 42*a*). In this instance, if the flow cannot return to Step 31, it returns to Step 32. If the coordinates are within the above range, whether or not the value of the keyword ID has already been set in the selection keyword ID storage area is examined (Step 43), and if the value is set, the inverted display of this set keyword is reported to the original display (Step 44), and the interruption of the animation sequences, which have not yet been completed among the animation sequences corresponding to the keyword that has been reversely displayed, is reported to the animation reproduction unit 16 and is completed (Step 45). Next, the keyword which is newly input is displayed in inverted form (Step 46), and all the animation window IDs, the start addresses, the end addresses, etc., which are controlled by this new keyword ID, are transmitted to the animation reproduction unit 16 and are reproduced (Step 47). Thereafter, the keyword, which is newly selected during the selection, is set in the keyword ID storage area (Step 48).

The operations shown in FIGS. 8(A), 8(B) and 9 will be explained by the use of the definite numeric values shown in FIG. 3. Assuming that the keyword ID 12 has already been selected in the area for storing the keyword IDs, which are presently selected, the keyword ID 12 which is now selected is set in this area as the selected keyword. When the end of the corresponding animation window ID 1002 is received, the process described above is executed and then this selection keyword ID storage area is cleared. If the input processing unit 12 detects the keyword selection input before the end report arrives during this keyword selection operation (such as the keyword ID 13), the animation keyword control unit 13 first checks the selection keyword ID storage area. If the value has already been set, it instructs the display control unit 15 to return the inverted display of the set keyword to the original display, and further instructs the animation reproduction unit 16 to suspend the animation being reproduced by this keyword. (In this case, the suspension instruction is given to the animation window IDs 1000, 1001 and 1002).

After the animation keyword control unit 13 instructs the display control unit 15 to display the keyword ID (13) in inverted form, it takes out the animation information to be reproduced by this keyword from FIG. 3 and reports it to the animation reproduction unit 16. (In this case, the start addresses/end addresses 23000/23500, 87300/87800, 55800/56500 are designated by the animation window IDs 1000, 1001, 1002 to the animation reproduction unit 16, respectively.) The newly selected keyword ID (13) is set in the selection keyword ID storage area. Thereafter, similar processes are executed, and animation display by the selection of other keywords becomes possible.

FIGS. 10(A), 10(B) and 11(A), 11(B) show the operation flowcharts for repeatedly and consecutively reproducing the display of the animation sequence of a keyword when forced completion of the animation sequence corresponding to the selected keyword or the display of all the displays corresponding to the keyword is completed. This repetition can be completed by selecting this inverted keyword again. Incidentally, Steps with the same reference numerals in FIGS. 10(A), 10(B) and 11(A), 11(B) represent the same content as in FIGS. 8(A), 8(B) and 9(A), 9(B).

In this case, a flag area for representing whether or not the animation reproduction is to be repeated, or in other words, the end processing flag, is prepared for each keyword ID as shown in FIG. 3, and this end processing flag is set by the supplier of the animation sequence.

The animation keyword control unit 13 receives the forced end report of the animation (the end animation window ID in FIG. 3) at Step 36 in FIG. 10 from the animation reproduction unit 16. When the display of all the animation sequences of this keyword is completed, the animation keyword control unit 13 watches the end processing flag in FIG. 3. When the mode is the repetition mode (Step 50), it reports the interruption of the animation sequences which are not yet completed, to the animation reproduction unit 16 and completes the display (Step 51). It then transmits all the animation window IDs, their start addresses and the end addresses controlled by the keyword ID which is now selected, to the animation reproduction unit 16, and starts once again the reproduction of the animation sequences (Step 52). In the example shown in FIG. 3, the reproduction of the animation sequences is not executed after the detection of the end animation window ID when the keyword IDs are IDs 10 and 11, and automatically executes reproduction from the beginning after this end animation window ID when the keyword IDs are IDs 12, 13.

This repeated reproduction can be terminated by again selecting the keyword which is inverted, or by selecting other keywords. This case is shown in FIG. 11. When the selected keyword is the same as the keyword which is newly selected, the flow proceeds to Step 38 in FIG. 10 and the display of all the animation sequences corresponding to this keyword is completed. When they are different, the operation flow explained with reference to FIG. 9 is employed. In other words, an instruction is sent to the display control unit 15 so as to return the keyword display which is inverted at present to the original display (Step 44). An instruction is sent to the animation reproduction unit 16 to suspend the display of the animation sequences that have been displayed so far (Step 45). Then, the newly selected keyword is displayed in inverted form (Step 46), and the data of the animation window ID corresponding to the newly selected keyword ID and shown in FIG. 3 is transmitted to the animation reproduction unit 16, and the animation reproduction is started (Step 47). The newly selected keyword is then set in the selection keyword ID storage area (Step 48).

As is obvious from the above explanation, the present invention makes it possible to simultaneously reproduce corresponding animation sequences when the user designates the area representing one keyword, and to reduce the number of operation steps. When a plurality of animation sequences are watched, the present invention makes it possible to more fully understand the display content by synchronously reproducing these animation sequences. Further, the present invention makes it possible to view substantially instantaneously the desired scenes by keywords from a series of animation information, and to more easily retrieve the animation sequences involving a great deal of information.

We claim:

1. A computer-implemented image display method having plural keywords wherein one of the keywords and one scene among a plurality of scenes forming an animation sequence corresponding to said one keyword are displayed as a still picture on a screen, and an animated-display operation of said animation sequence corresponding to said one keyword is activated when said one keyword is designated by an operation of a user, wherein each of said keywords has, corresponding thereto, a keyword identifier, a display area for displaying said keyword, a plurality of animation window identifiers for representing an animation window on the screen for displaying a corresponding animation sequence, and animation information describing a plurality of pairs of a start address and an end address of said animation sequence, and when said display area is designated so as to designate one of said keywords, a plurality of animation sequences corresponding to said one of said keywords are displayed simultaneously and in parallel on a plurality of animation windows from each start address of said animation sequences.

2. A computer-implemented image display method according to claim 1, wherein when said one of said keywords is designated, said corresponding keyword display area assumes a different display form from other non-selected keyword areas.

3. A computer-implemented image display method according to claim 2, wherein, when said designated corresponding keyword display area has a display form different from those of non-selected keyword areas, said designated corresponding keyword display area is displayed in reversed-display mode.

4. A computer-implemented image display method according to claim 2, wherein an animation sequence having all the animation window identifiers corresponding to said keyword identifier is displayed on corresponding animation windows.

5. A computer-implemented image display method according to claim 2, wherein when the display of an animation sequence having all the animation window identifiers corresponding to said keyword identifier is terminated, the display form of said keyword display area is returned to original form.

6. A computer-implemented image display method according to claim 2, wherein, when the animation window identifiers corresponding to said designated keyword identifier exist, one of said animation window identifiers is described as an end animation window identifier in said animation sequence, and when the display of said end animation window identifier is completed, the other animation sequences, which are displayed, of the corresponding keyword identifier are completed.

7. A computer-implemented image display method according to claim 6, wherein, when the display of said end animation sequence identifier is completed, the display form of said selected keyword display area is returned to original form.

8. A computer-implemented image display method according to claim 2, wherein, when another of said keywords is designated during the display of said animation sequence corresponding to said designated keyword, the display of said animation sequence of said designated keyword is suspended and the animation sequences corresponding to said other keyword are displayed on a plurality of animation windows.

9. A computer-implemented image display method according to claim 1, wherein an end processing flag having respective information specifying the existence and absence of repetition of a display is disposed in said animation sequence for each of said keyword identifiers, and when said end processing flag specified repetition of a display, the display of said animation window identifier corresponding to said keyword identifier is repeated the specified number of times.

10. A computer-implemented image display method according to claim 2, wherein the display form of said selected keyword display area is returned to an original state by designating said one keyword, and the display of all of said animation window identifiers corresponding to said one keyword is completed.

11. A computer-implemented image display method wherein a plurality of keyword display areas for individually displaying a plurality of keywords different from each other and an image display area capable of displaying simultaneously or individually a plurality of animation sequences or still pictures different from each other are displayed on a screen, and the plurality of still pictures or animation sequences different from each other corresponding to at least one of said keywords or the plurality of still pictures or animation sequences different from each other corresponding to the plurality of said keywords different from each other, respectively, are displayed in said image display area, wherein the plurality of animation sequences are displayed simultaneously and in parallel on a plurality of animation windows.

12. A computer-implemented image display method according to claim 11, wherein the plurality of still pictures different from each other corresponding to at least one of said keywords or the plurality of still pictures different from each other corresponding respectively to a plurality of keywords different from each other are displayed in said image display area at the initial stage of said screen display.

13. A computer-implemented image display method according to claim 12, wherein at least one of said still pictures corresponding to at least one of said keywords and displayed in said image display area is switched to said animation display when at least one of said keywords displayed in said keyword display areas is selected.

14. A computer-implemented image display method according to claim 11, wherein said still picture displayed in said image display area represents a part of an image among said animation sequences corresponding to at least one of said keywords.

15. A computer-implemented image display method, comprising:
    displaying an animation sequence corresponding to one keyword out of a plurality of keywords as a still picture on a screen;
    activating an animated-display operation of the animation sequence corresponding to the one keyword when the one keyword is designated by an operation of a user; and
    displaying simultaneously and in parallel on a plurality of animation windows a plurality of animation sequences corresponding to the one keyword, with a display area for displaying the keyword being designated by a plurality of pairs of a start address and an end address of the animation sequence.

* * * * *